(12) United States Patent
Motosko

(10) Patent No.: US 6,955,227 B1
(45) Date of Patent: Oct. 18, 2005

(54) AUGER FOR MIXING AND BURROWING

(75) Inventor: Thomas P. Motosko, Cambridge, WI (US)

(73) Assignee: Versatile Housewares, Cambridge, WI (US)

( * ) Notice: Subject to any disclaimer, the term of this patent is extended or adjusted under 35 U.S.C. 154(b) by 0 days.

(21) Appl. No.: 10/251,731

(22) Filed: Sep. 21, 2002

(51) Int. Cl.⁷ .............................................. A01B 13/00
(52) U.S. Cl. ....................... 172/25; 172/41; 172/111; 172/21; 175/394
(58) Field of Search ........................... 172/41, 378, 25, 172/111, 371, 540, 21, 22; 111/115, 116; 175/394, 19

(56) References Cited

U.S. PATENT DOCUMENTS

| | | | |
|---|---|---|---|
| 4,074,780 A * | 2/1978 | Gilbert ...................... 175/392 |
| 4,282,943 A * | 8/1981 | Leitner ...................... 175/394 |
| 4,323,019 A | 4/1982 | Haddock |
| 4,459,924 A | 7/1984 | Hassan et al. |
| 4,672,901 A | 6/1987 | Stine |
| 4,728,035 A | 3/1988 | Cruse et al. |
| 4,751,971 A | 6/1988 | Thompson |
| 4,807,710 A * | 2/1989 | Greeley ...................... 175/394 |
| 4,901,800 A | 2/1990 | Wilson |
| 4,981,000 A * | 1/1991 | Hamilton et al. .............. 52/157 |
| 4,986,368 A * | 1/1991 | Underwood et al. ........ 175/394 |
| 5,067,571 A * | 11/1991 | Niewold et al. ............ 175/394 |
| 5,113,952 A * | 5/1992 | Niewold et al. .............. 175/57 |
| 5,133,269 A | 7/1992 | Charneski |
| 5,540,433 A | 7/1996 | Engstrom et al. |
| 5,564,353 A | 10/1996 | Wade et al. |
| 5,810,093 A | 9/1998 | Howard |
| 6,050,344 A | 4/2000 | Larson et al. |
| 6,119,787 A | 9/2000 | Garcia |
| 6,125,776 A | 10/2000 | Carmichael |
| 6,227,317 B1 | 5/2001 | Severns |
| 6,296,068 B1 | 10/2001 | Frederick |
| 6,311,782 B1 * | 11/2001 | Plasek et al. .................. 172/13 |
| 6,352,122 B1 | 3/2002 | Love |
| 6,595,298 B1 * | 7/2003 | Crady ......................... 172/41 |
| 6,675,918 B2 * | 1/2004 | Chou ......................... 175/394 |
| 6,722,444 B2 * | 4/2004 | McKill ........................ 172/41 |

OTHER PUBLICATIONS

"Power Auger, 12" " advertised at http://www.wdrake.com, undated.
"5pc. Auger Bit Set-Value Price" advertised at http://www.ioffer.com, undated.
"Irwin 7/8" Power Long Ship Auger Bit, 17" OL, 12"Twist" advertised at http://www.castlewholesalers.com, undated.
"Augers" advertised at http://www.lawson-his.co.uk, undated.
"2.0" Boring Machine Auger Bit" advertised at http://www.goantiques.com, undated.
"Ardisam 9800 2-Man Earth Auger w/8" Bit" advertised at http://www.cgi.ebay.com, undated.
"Garden Auger" advertised at http://www.gardenauger.com, undated.

(Continued)

*Primary Examiner*—Victor Batson
(74) *Attorney, Agent, or Firm*—Boyle Fredrickson Newholm Stein & Gratz S.C.

(57) ABSTRACT

An auger to assist in ground-burrowing or mixing paint or concrete, is used by attaching it to an electric or cordless power source. The major advantages over previous augers are: a hex head design prevents slipping in the drill chuck, an offset boring tip provides better digging, and a removable extension allows for the digging holes from a sitting or standing position possible without straining. The cutting edge of the auger's discs is sharpened for easier digging in hard soil. A single spring pin lock connects a first shaft to the extension shaft.

14 Claims, 5 Drawing Sheets

OTHER PUBLICATIONS

"Power Planter" advertised at http://www.powerplanter.com, undated.

"Big Max 2000" advertised at http://www.bigmax2000.com, and http://www.qvc.com, undated.

"Ground Aug I" digital pictures and instruction sheet. On or about Jan. 2000.

"Ground Aug I" digital pictures from supplier. On or about Apr. 22, 2001.

"Ground Aug I" digital pictures from supplier. On or about Jun. 8, 2001.

"Ground Aug I" digital pictures from supplier. On or about Jun. 13, 2001.

* cited by examiner

AUGER FOR MIXING AND BURROWING

BACKGROUND OF THE INVENTION

1. Field of the Invention

The present invention relates in general to the field of augers. More particularly, the present invention relates to an auger for use in mixing and burrowing. Specifically, one preferred embodiment of the present invention relates to an auger having an extension for use primarily in the home or garden.

2. Discussion of the Related Art

Historically, it was known in the prior art to of the type hereunder consideration to use an auger device to make holes or to mix various liquids and solids.

As is known to those skilled in the art, such auger attachments can be affixed to common hand tools with power sources such as an electric drill or weed eater device. However, a previously recognized problem has been that such augers are specifically usually manufactured for use with one device or the other. Needless to say, it is desirable to have an auger that can be used in the sitting or kneeling position and in a standing position with various power sources.

Therefore, what is needed is an auger that can be used with a variety of household power tools and has an adjustable length. Such an auger is also preferably lightweight, yet is sufficiently strong enough to bore into harder soils. Heretofore these requirements have not been fully met without incurring various disadvantages.

Previously recognized solutions also have the disadvantage of relatively high cost. As such, a preferred solution will be seen by the end-user as being cost effective.

The below-referenced U.S. patents disclose embodiments that were at least in-part satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

U.S. Pat. No. 5,133,269 discloses an auger with replaceable tips designed to cut openings through sheet plastic or fiberglass in a continuous operation making an appropriate diameter hole for planting seedlings or seeds as may be desired. The invention is comprised of a shaft with a spiral auger and a cutting tip with a cylindrical cutting edge and a recessed drilling portion as an assembly which is removably attached to the shafts with flights in it. The device can be driven by a conventional electric drill with a one-half inch chuck.

U.S. Pat. No. 6,119,787 discloses an auger planting tool for boring holes to conveniently implant plants into the soil. The auger planting tool can be attached to a drill or a weed trimming device. By triggering the rotating drive device, the auger tool is driven to the intended depth made for the soil. A detent ring controls the penetration of the auger tool into the soil. An auger spiral flange simultaneously provides a cutting and a screwing action attributable to the spiral configuration thereof. The auger spiral flange is fixedly attached to a shaft and includes a plurality of cutting blades and a plurality of contiguous spiral surfaces.

SUMMARY AND OBJECTS OF THE INVENTION

By way of summary, the present invention is directed to an auger which is both lightweight and durable. One object of the invention is to provide an apparatus that can be used in a standing or sitting position and can be used with a variety of power tools. Another object of the invention is to provide an apparatus that has one or more of the characteristics discussed above but which is relatively simple to manufacture and assemble using a minimum of equipment and is relatively inexpensive.

In accordance with one aspect of the invention, these objects are achieved by providing an apparatus comprising a shaft having a first end and a second end. The first end of the shaft contains a hexagonal shape portion and the second end includes a pointed tip which is offset from center and has one flat side at a preferred angle. A disc is attached a distance from the second end. In another embodiment, a second or extension shaft is provided which is longer than the first. The second shaft has a first end and a second end. Located at the first end is a hexagonal shaped portion. At the second end there is a first shaft receiving portion with the bore therethrough. The first shaft is attached to the second shaft by a shaft locking device or pin. Having a first shaft and a second shaft allows versatility of use with different types of power tools. Moreover, it also allows the user to use the auger in both a kneeling or sitting position and a standing position. Another object of the invention is to provide a method that has one or more of the characteristics discussed above but which is relatively simple to set up and operate.

In accordance with another aspect of the invention, these objects are achieved by providing an inventive method. First, preferably an auger is inserted into an electric drill having opened chuck jaws. Next, a hexagonal head of the auger is inserted into the chuck jaws of the drill. The chuck jaws are then tightened around the auger's hexagonal head. A pointed, sharpened end of the auger is then inserted into the soil. And, finally, power is applied to the drill to burrow a hole into the soil or to mix a liquid or a particular solid.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
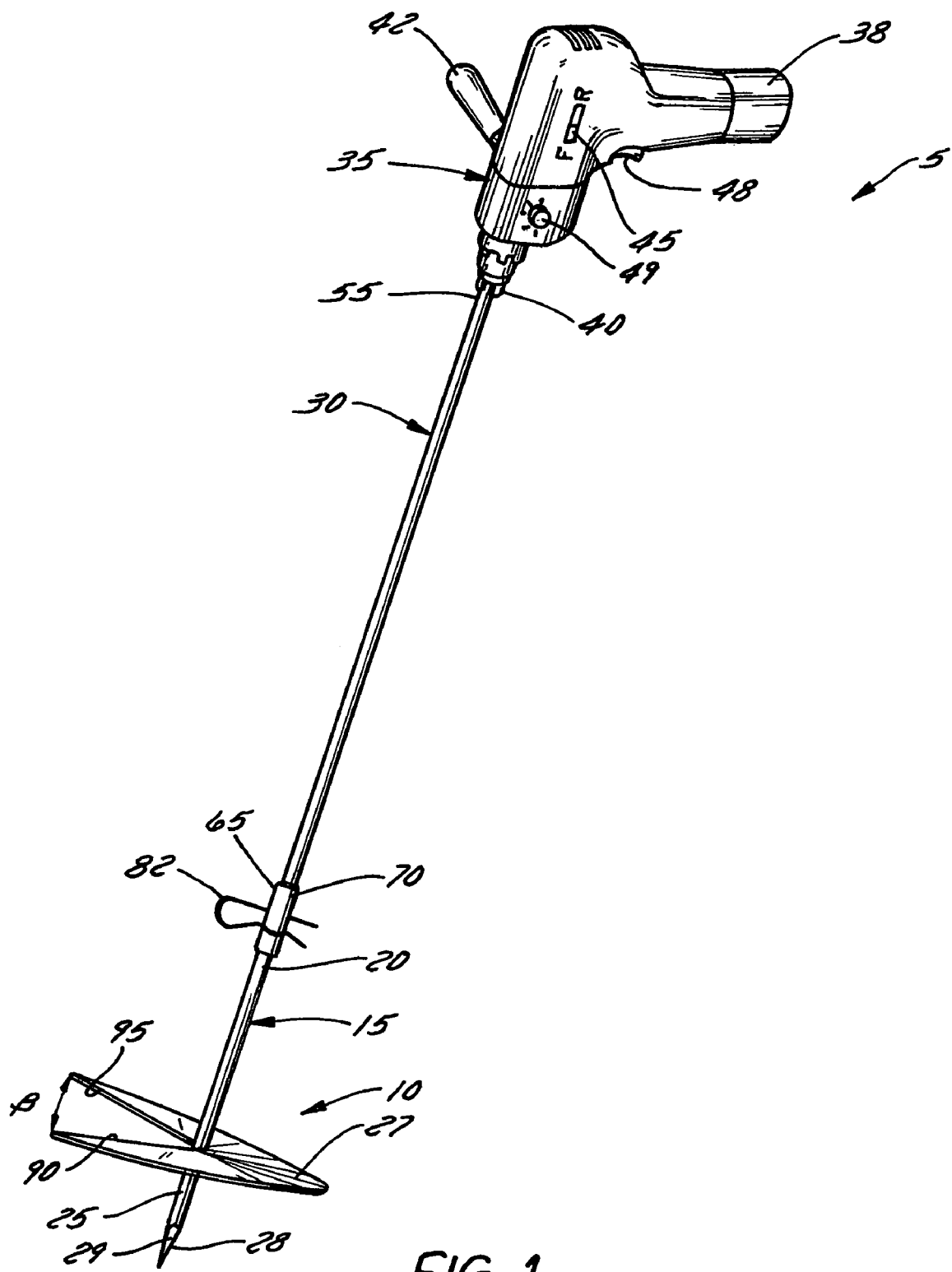
FIG. 1 shows a perspective of one preferred embodiment of the device of the present invention.

In describing the preferred embodiment of the invention and the best mode currently contemplated which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

In its most basic form, the invention is an attachment to a device that provides power, such as a hand-held drill or a weed trimmer. The auger portion contains 1 to 4 discs which are rotated. They are connected to a shaft with a hex head which prevents it from slipping when power is applied. The attachment can be extended to about 26 inches long so the user can stand up while using it, and does not have to stoop over. A pin mechanism holds the first shaft to a second or extension shaft. The device is preferably zinc-coated steel so it is somewhat rust free. However, it may also be made of stainless steel. The power source can be a typical 12 volt or better electric drill, either portable, battery-operated type, or electrical or can be an electric or gas-powered weed trimmer.

2. Detailed Description of Preferred Embodiments

FIG. 1 shows a device 5 of the present invention which can be used for gardening or the mixing of various liquids and particulate solids such as dirt, cement, and paint. The device 5 has an auger 10 including a first shaft 15. Preferably, the first shaft 15 is approximately 15 inches long, or less, and has a first end 20 and a second end 25. The auger 10 also has at least one disc 27 which is preferably spiraled to permit a better digging and mixing capacity. The disc 27 is preferably located toward the second end 25 approximately 2 or 3 inches from a tip 28. With the extension attached the auger can also be used to dig a fencepost hole. The three-inch disc is for cultivating soil and weeding; four inch disc is for planting and digging post holes.

Figure 2:
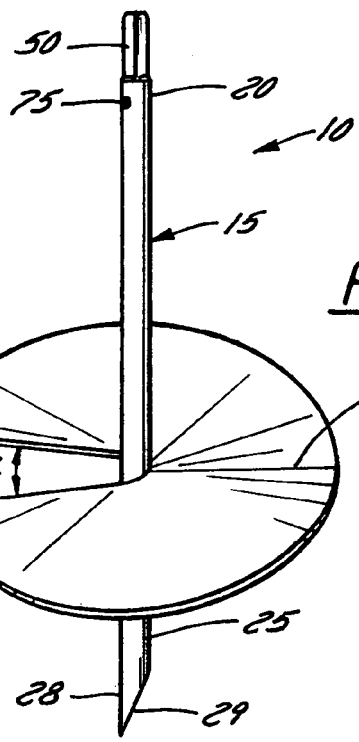
FIG. 2 shows one embodiment of the auger of the device shown in FIG. 1.

As shown in one preferred embodiment shown in FIG. 2, the tip 28 has an offset shaved flat side 29 which is angled approximately 20 degrees from center. The tip 28 is approximately 1 inch long. At the other or first end 20 of the first shaft 15, is a hexagonal shaped portion 50. In the preferred embodiment shown at FIG. 1, the first shaft 15 is connected to a second shaft 30. The second shaft 30 is in turn connected to a power source 35. The power source 35 is preferably an electric drill which has a battery pack 38 and ⅜" or ½" chuck jaws 40. In one preferred embodiment, a stabilizer handle 42 is also present. The power source 35 may have a forward and reverse control 45 as well as an on/off control 48.

As best shown in FIG. 2, the disc 27 has a leading edge 90 and a trailing edge 95 and is flexed in a spiral configuration to form the angle β (see FIG. 1). The angle θ is preferably approximately 35 degrees. The outermost portion of the edges 90 and 95 are preferably sharpened for enhanced digging capabilities. The disc 27 is preferably welded to the shaft 15.

In the top down angled view shown in FIG. 2, the spiral disc portion forms angle α. Preferably, a is 5 degrees. The disc 27 may be 2 inches, 3 inches, or 4 inches in diameter, depending on the use for the auger. The disc 27 is preferably welded to the shaft 15.

The second shaft 30 is preferably approximately 26 inches long and, as mentioned previously, has a first end 55 and a second end 65. At the first end 55 of the second shaft, is a hexagonal portion 60. The hexagonal portion 60 of the second shaft 30 is approximately 1.5 inches long as is the hexagonal portion 50 of the first shaft 15.

The second end 65 of the second shaft 30 includes a receiving portion 70. The receiving portion 70 has a bore 78 (best shown in FIG. 6). Preferably, the length of the receiving portion 70 is 2.75 inches and the depth of the bore 78 is approximately 2 inches while the diameter of the bore is approximately 0.5 inches. The receiving portion 70 receives the portion 50 of the first shaft 15.

Figure 4:
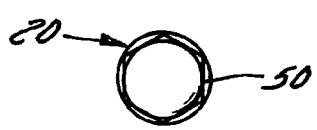
FIG. 4 shows a top plan view of the hexagonal shaped portion of the first end shown in FIG. 3.
Figure 3:
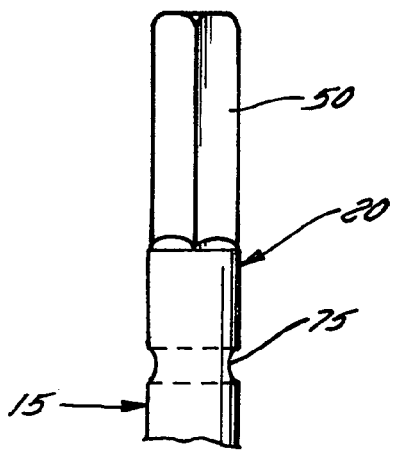
FIG. 3 shows a side view of the hexagonal shaped portion at the first end of the first shaft shown in FIG. 2.

As best shown in FIGS. 3 and 4, the hex portions 50, 60 have preferably diameters of less than 0.5 inches. A hole 75 is preferably located on the first shaft 15 approximately 2 inches from its outermost end.

FIG. 4 shows a top down view best illustrating the outermost end of the hexagonal shaped portion 50 or 60 which are located at the first ends 20, 55 of the rounded shafts 15, 30.

Figure 5:
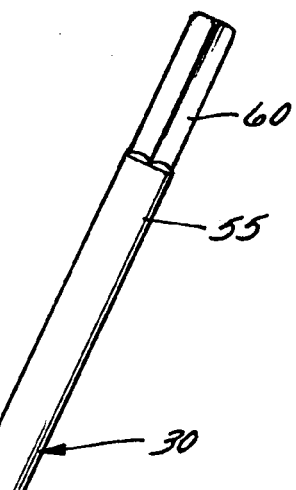
FIG. 5 is a perspective view of the second shaft of the present invention shown in FIG. 1.

FIG. 5 shows second shaft 30 which acts as an extension bar for the device 5 (not shown) adding additional length to the auger tool 10 (not shown) to allow for use of the device 5 while standing instead of stooping or bending. This extension shaft is particularly useful for older people and those with back or limb joint pain.

Figure 6:
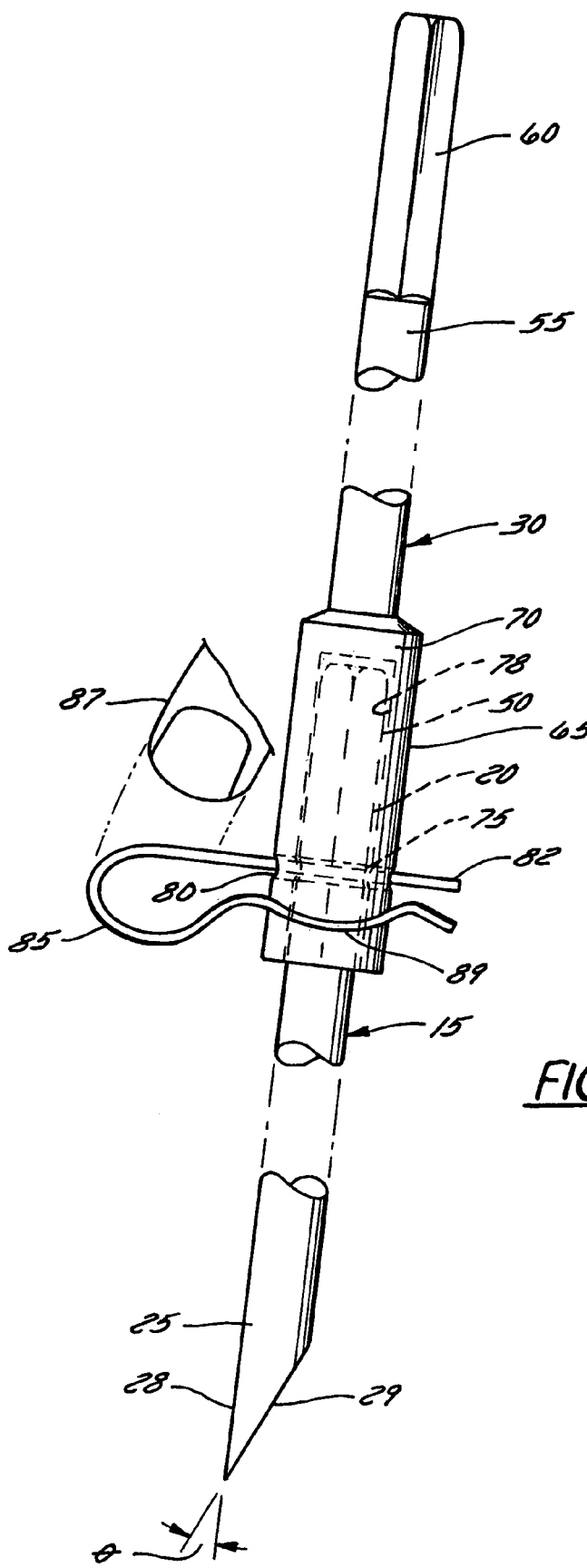
FIG. 6 is a side view of specific portions of the invention shown in FIG. 1.

FIG. 6 shows a close-up view of how the first shaft 15 is connected to the second shaft 30. In FIG. 6, the tip 28 is shown at the second end 25 of the first shaft 15 as is the shaved flat side 29 of the tip. Again the flat side is offset from center and is shaved at an angle 0. Angle 0 is preferably approximately 20 degrees.

In FIG. 6, the first end 20 of the first shaft 15 is shown engaged in the receiving portion 70 at the second end 65 of the second shaft 30 as shown the hexagonal portion 50 of the first end 20 of the first shaft 15 fits into the bore 78 at the shaft receiving portion 70. The first shaft 15 has hole 75 which is aligned with hole 80 in the second shaft 30. In one embodiment, a U-shaped pin 82 is inserted through the aligned holes 75 and 80. The U-shaped pin 82 preferably has a finger loop 85 and a bend 89. The finger loop 85 is configured to receive a finger 87 of a user for quick detachment of the pin and thus the first shaft 15 from the second shaft 30. The bend 89 is configured to fit snugly around the receiving portion 70 of the second shaft 30 to hold the pin 82 in place during use. The diameter of the bend 89 is preferably slightly larger than the diameter of the portion 70. The U-shaped pin 82 is preferably steel or stainless steel and is formed from a thicker and stronger gauge of wire. These materials and this thickness help to prevent the pin 82 from easily shearing during operation.

Figure 7:
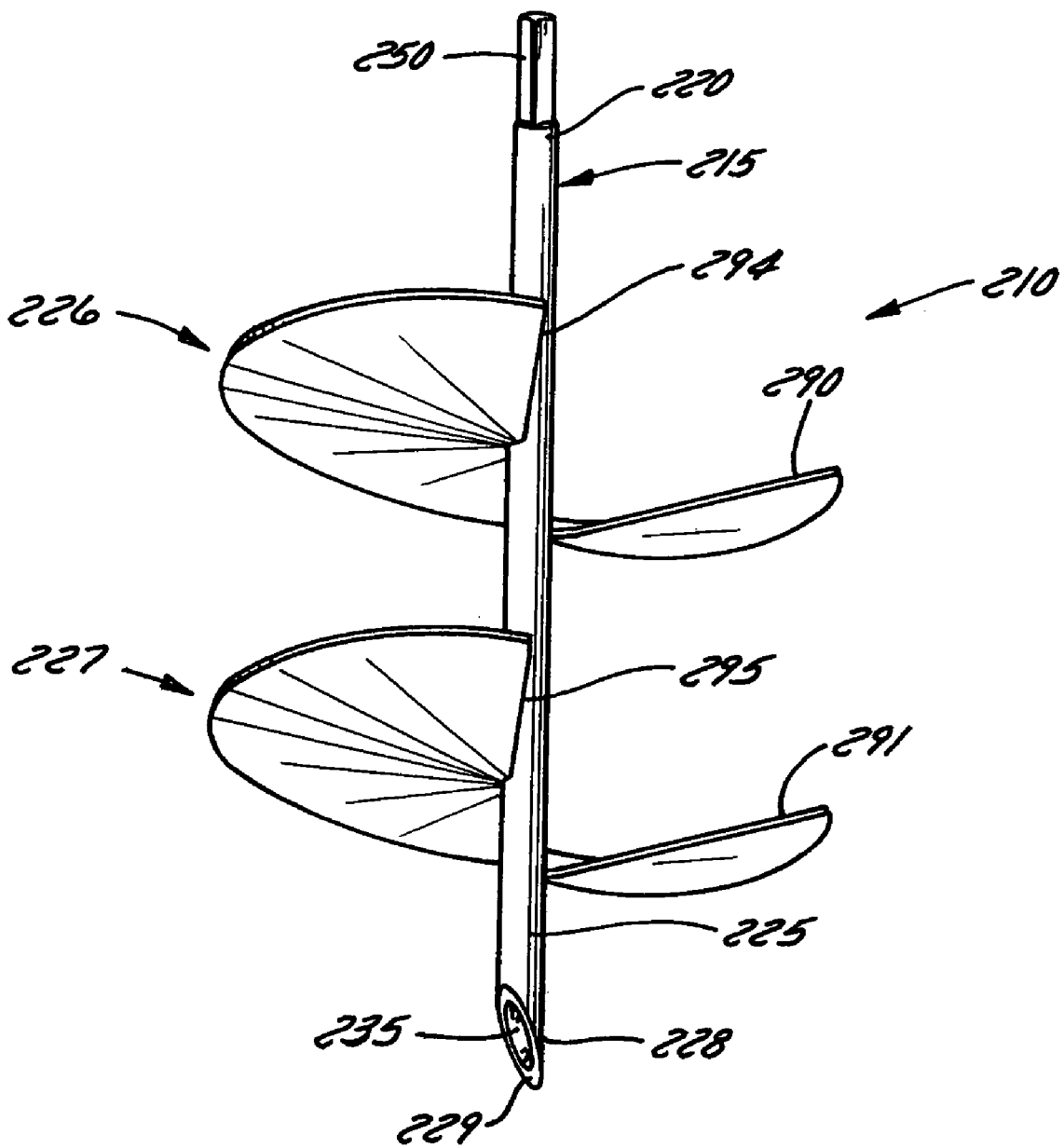
FIG. 7 shows an alternative embodiment of the auger of the present invention.

FIG. 7 shows an alternative embodiment of the device 5. This embodiment is much smaller in dimension than the one previously described. However, it has many of the same features. The reason why this embodiment is smaller is because it is configured to fit on the end of a powered weed trimming tool. The features that remain the same are the device 205 including an auger 210 having a first end 220 and a second end 225. The first end has a hex portion 250. There is also a shaft 215. One slight modification in this embodiment is that at the second end 225 a tip 228 has a shallow cavity 235 instead of a shaved flat portion. This shallow cavity and the outside edges of the shaft help form a cutting surface or portion 229 which can better bore into hard soil. What is also different about this embodiment is that there are two discs 227 and 226. Each of these discs 226, 227 contains a leading edge and a trailing edge, 290 and 291 and 294 and 295, respectively. The cavity 235 on the tip 228 can be made with a boring tool.

Figure 8:
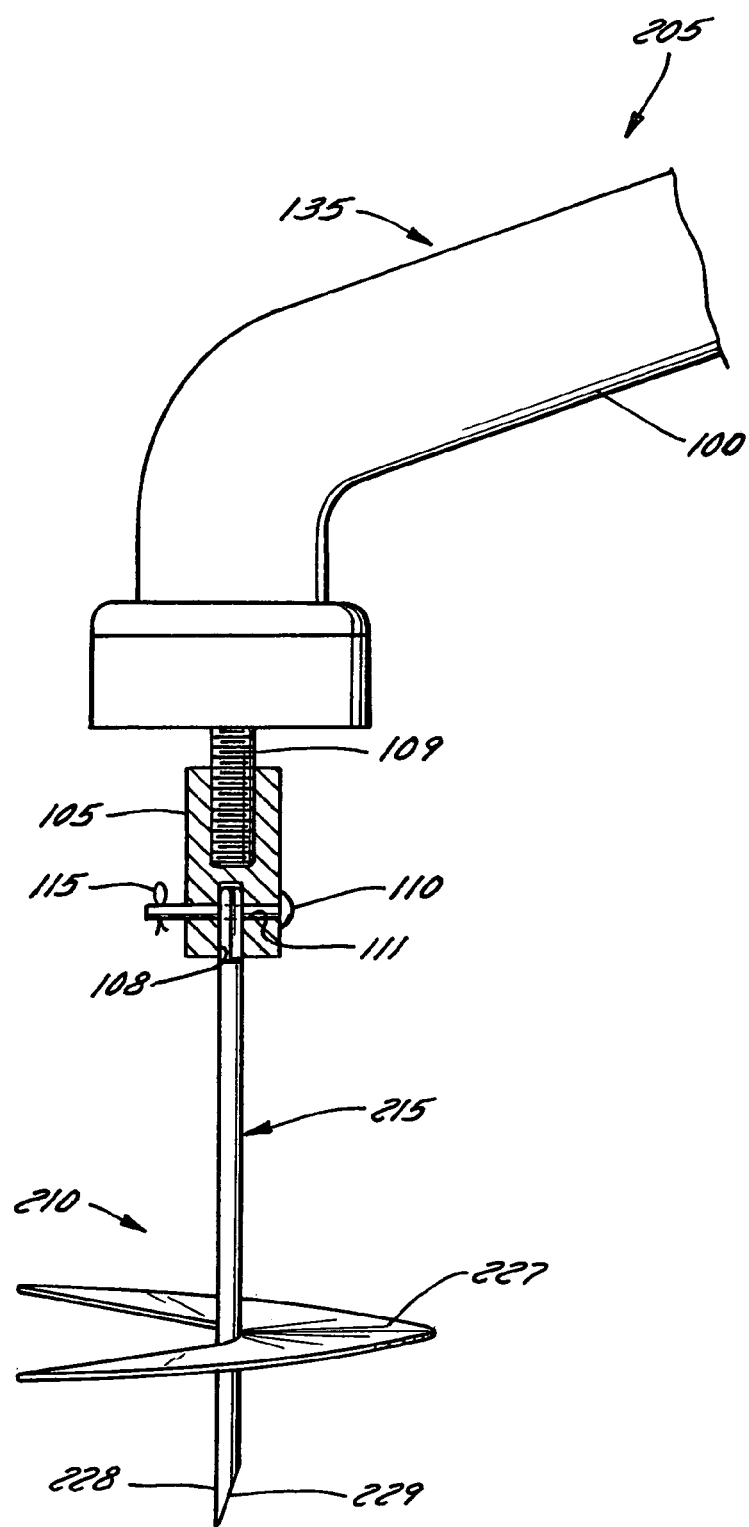
FIG. 8 shows an alternative embodiment of the auger attached to an alternative power source with portions of the chuck cut away for better visibility.

As shown in FIG. 8, this embodiment can fit in a threaded chuck 105 of the weed trimmer 100 which is also designated 135 as an alterative power source. The threaded chuck is attached to a threaded shaft 109 which is connected to the weed trimming alternative power source 135. On one end of the threaded chuck is a hexagonal-shaped hole 108. Pin 110 is inserted through a bore 111 in the threaded chuck 105 then through the hole in the auger 210 and out the other side of the chuck 105 to connect the shaft 215 to the power source 135. The pin 110 may be held in place by a cotter key 115.

3. In Use and Operation

When the device 5 is in use, the auger 10 must first be attached to the power source 35. To do this, the preferred embodiment auger 10 is inserted into an electric drill 35 by first ensuring the chuck jaws 40 of the drill 35 are open to receive the auger 10. The hexagonal portion or head 50 of the auger 10 is placed into the chuck jaws 40 of the drill 35. Preferably, the chuck jaws are tightened around the auger's hexagonal head 50. In one preferred embodiment, the pointed, sharpened end 29 of the auger 10 is inserted into soil for mixing or boring. Finally, power is applied to the drill 35 through preferably an on/off control switch or trigger 48.

In devices 5 that have power sources with a forward and reverse switch 45, the power source 35 control lever is first switched to a forward position. In devices 5 that have multiple speeds, the low speed control 49 is selected. Next, the trigger or on/off control switch 48 is then depressed by preferably a finger of the user to apply power to the auger 10. The auger sharpened tip 28 which has been resting on the dirt is kept in preferably a perpendicular position while a downward pressure is applied to the drill. This pressure and the forward drilling action of the spiral disk 27 of the auger tip 29 push the auger into the soil, thus drilling a hole.

In one preferred embodiment after the hole is drilled, the reverse position is selected on the forward/reverse control 45. When the on/off control 48 is depressed the auger 10 reverses its original downward drilling motion to raise the auger 10 back out of the soil along with loosened dirt.

In one preferred embodiment, an extension shaft 30 can be added to the auger shaft 15 in order to allow the user to use the auger 10 in an upright position. This is preferably done by inserting a hexagonal head 50 of the auger shaft 15 into a receiving portion 70 of the second shaft 30. Next holes 75, and 80 of the shafts 15, and 30 are aligned. A locking pin 82 is inserted through the holes 75, and 80 to attach the shafts 15, and 30 together and thus provide an extension to the auger 10. Preferably this is done while the drill 35 and the auger 10 are in a horizontal position.

When the soil boring or mixing project is complete, the auger 10 is preferably laid in a horizontal position and the chuck jaws 40 are loosened to release the auger's hexagonal head 50. The auger 10 is then lifted from the power source 35. The open chuck jaws 40 thus release the auger 10 so that the user can remove it and store it for use on another occasion.

In addition to mixing and boring, there are virtually innumerable uses for the present invention, all of which need not be detailed here. Moreover, all the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The individual components mentioned herein need not be fabricated from the disclosed materials, but could be fabricated from virtually any suitable durable and strong materials.

Moreover, the individual components need not be formed in the disclosed shapes, or assembled in the disclosed configuration, but could be provided in virtually any shape, and assembled in virtually any suitable configuration. Further, although the discs described herein are physically separate modules, it will be manifest that the discs may be integrated into the shaft. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A device for attachment to a power source to bore a hole in soil comprising:
   a) a first shaft having a first end and a second end; the first end including a hexagonal-shaped portion, the second end including a pointed tip offset from center and shaved flat on one side at an angle configured for boring a hole in the soil, wherein the pointed tip has a cavity therein; b) a disc attached a distance from the second end; and
   c) a second shaft, longer than the first shaft, having a first end and a second end and wherein:
      1) the first end is hexagonal-shaped; and
      2) the second end has a first shaft receiving portion with a bore therein; and
   d) a U-shaped pin removable with a finger and used for affixing the first shaft to the second shaft.

2. The device of claim 1, wherein:
   a) the first shaft is about 15 inches long and further includes a hole therethrough approximately 2 inches from the first end;
   b) the disc is attached at a distance of approximately 3 inches from the second end; and
   c) the length of the second shaft is approximately 26 inches long.

3. The device of claim 2, wherein the second shaft has a hole therethrough perpendicular to the shaft for receiving a shaft locking device.

4. The device of claim 2, wherein the shaft locking device includes a cotter pin with a looped portion, wherein the loop is of a sufficient size to accommodate the insertion of a human finger.

5. The device of claim 1, wherein the device is coated with a rust inhibitor.

6. The device of claim 1, wherein the disc is sharpened along the edges and angled at 35 degrees.

7. The device of claim 1, wherein the disc:
   a) is bent in a spiral configuration to enhance the digging capability, and
   b) has a leading edge that is slanted downwardly and a trailing edge that is slanted upwardly.

8. The device of claim 1, further comprising a shaft extender to allow the user to stand upright while operating the tool.

9. The device of claim 1, wherein the power source is a standard electric drill having a three-eighths drive for receiving the shaft and adding power to the device.

10. The device of claim 1, wherein the shaft is:
    a) configured to fit a half-inch chuck on a battery-powered power source
    b) constructed of half-inch in diameter steel rods.

11. The device of claim 1, further comprising a U-shaped locking pin having one arm bent to tightly fit around a shaft of an extension.

12. The device of claim 1, wherein;
    a) the device is constructed of durable materials for ease of use by gardeners of old age or with physical handicaps; and
    b) the disc is about three inches in diameter and is used for at least one of: burrowing into hard clay or frozen soil, aerating soil, mixing compost, mixing cement, and mixing paint.

13. The device of claim 1, wherein the disc is a four-inch in diameter disc and may be used to produce post holes or holes for shrubs.

14. A device for use in combination with a power source for boring a hole in soil comprising;
    a) a power drill with chuck jaws; and
    b) an auger attached to the power drill comprising:
        1) a first shaft comprising:
            i. a first hexagonal end,
            ii a second end opposite the first end having a sharpened tip with a shallow cavity and thin outside edges, and
            iii. a hole near the first end configured to receive a pin;
        2) a second shaft connected to said first shaft comprising;
            i. a first hexagonal end,
            ii. a second end opposite the first end and including a receiving portion configured to receive the hexagonal first end of the first shaft, and
            iii. a hole on the receiving portion aligned with the hole of the first end of the first shaft configured to receive a pin;
        3) a single U-shaped cotter pin configured to be inserted through the holes on the first and second shafts; and
        4) a spiral disc attached near the tip of the first shaft comprising a leading edge and a trailing edge.

* * * * *